United States Patent Office 3,135,347
Patented June 2, 1964

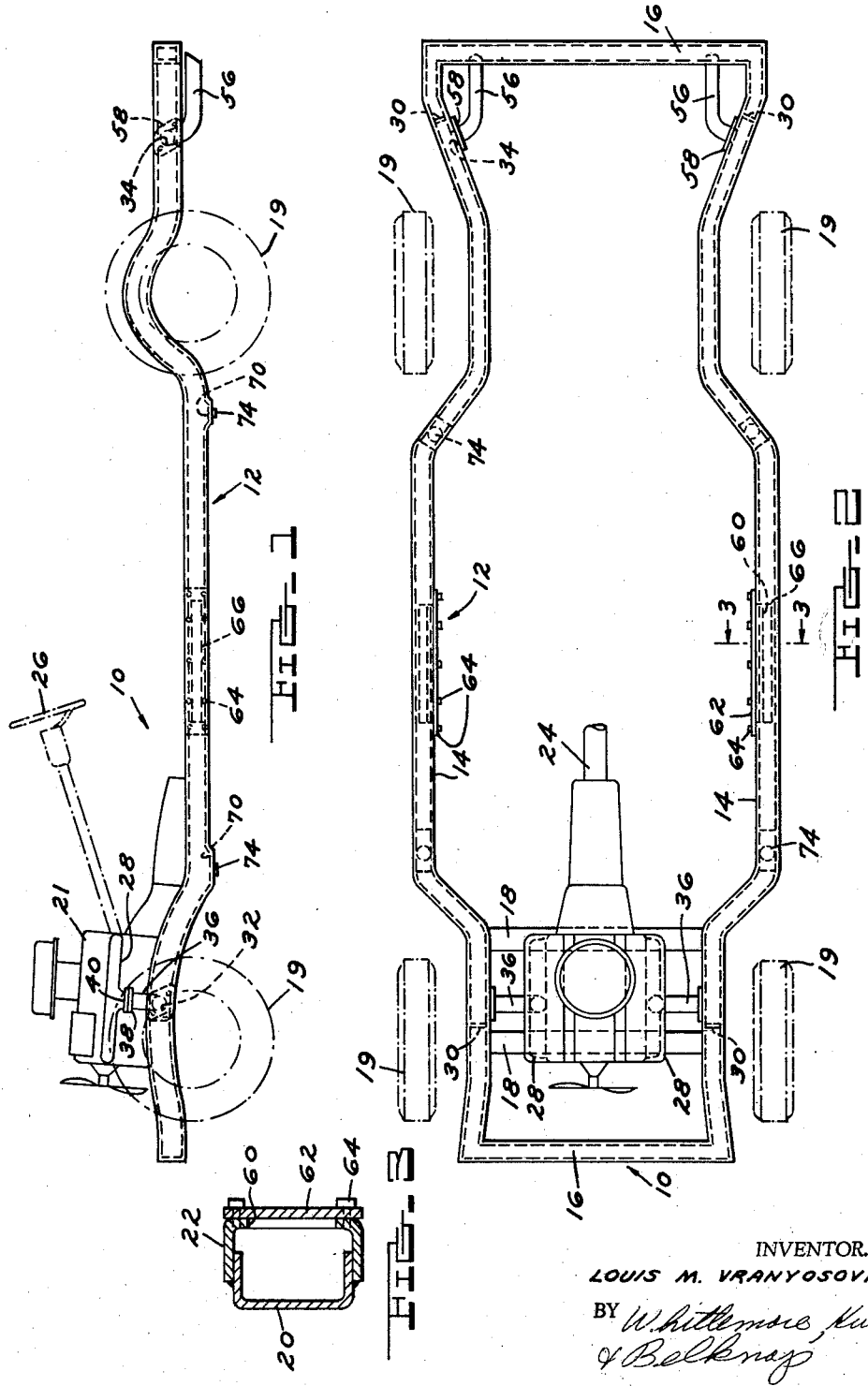

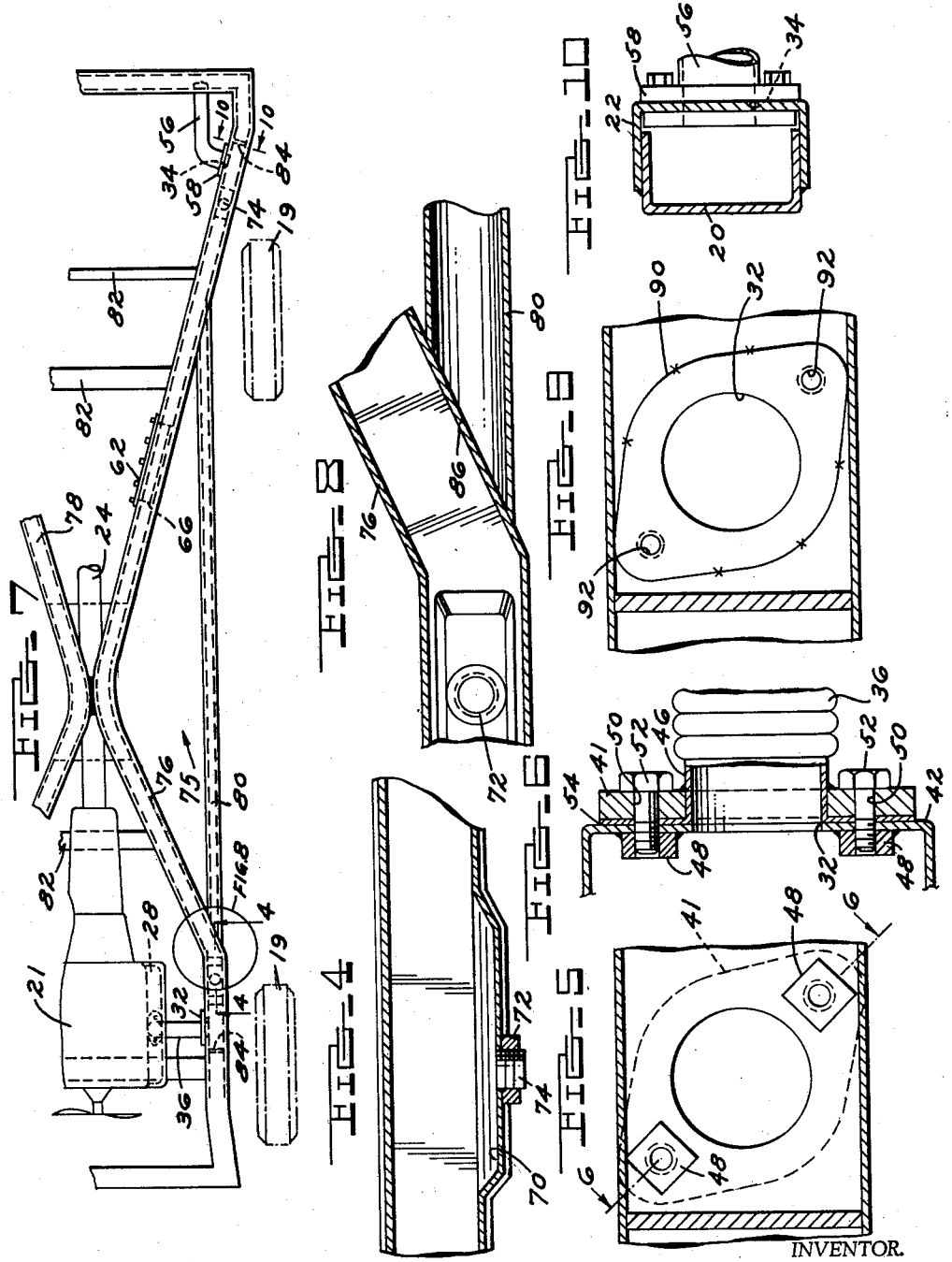

3,135,347
EXHAUST SYSTEM
Louis M. Vranyosovics, 5982 McGuire St., Taylor, Mich.
Filed Feb. 7, 1962, Ser. No. 171,668
1 Claim. (Cl. 180—64)

The present invention relates to a vehicle frame and more particularly to a tubular vehicle frame which is adapted to support an internal combustion engine and other units of an automotive vehicle and to transmit the exhaust gases from the engine to the atmosphere through the interior of the frame.

The modern passenger automobiles are wider and lower than in the past. Providing in the passenger cars a lower floor for the vehicle compartment presents problems relative to the disposition of the conventional exhaust means which usually extends beneath the vehicle underbody.

It is now proposed to take advantage of the tubular frame members which are presently utilized in modern automotive vehicles. The tubular frame members not only provide the requisite support for the body and the internal combustion engine but also are adapted in the present invention to serve as conduits for the exhaust gases from the engine thereby eliminating the conventional exhaust pipe and tailpipe as presently utilized in modern automotive vehicles.

It is an object of the present invention to provide a vehicle frame for supporting an internal combustion engine and for transmitting the exhaust gases from the engine to the atmosphere comprising a tubular frame supporting member closed at both ends, said tubular frame supporting member having an inlet and an outlet, and a flexible conduit connecting the exhaust manifold of the engine to the inlet of the tubular frame supporting member whereby the exhaust gases from the engine are directed through the interior of the conduit and tubular member to the outlet thereof, said flexible conduit compensating for engine vibrations and for any misalignment between the engine manifold and the inlet to the tubular frame supporting member.

Another object of the present invention is to provide a vehicle frame of the aforementioned type wherein a side wall of the tubular frame supporting member is provided with an opening which is normally closed by a removable closure plate, said plate permitting the insertion of a replaceable muffler into the interior of the tubular frame supporting member with ease.

Still another object of the present invention is to provide a vehicle frame of the aforementioned type wherein one or more removable drain plugs are provided in the bottom wall of the tubular frame supporting member for facilitating the removal of liquid condensations from the interior of the tubular frame supporting member.

It is thus another object of this invention to provide a simplified low cost structure of the aforementioned type having certain advantages contributing to efficiency, reliability and long life as well as ease of maintenance.

Other objects, advantages and novel details of construction of this invention will be made more apparent as this description proceeds, especially when considered in connection with the accompanying drawings, wherein:

FIGURE 1 is a side elevation of a vehicle frame which is particularly adapted for an automotive vehicle.

FIGURE 2 is a plan view of the vehicle frame of an automotive vehicle.

FIGURE 3 is a sectional view taken on the line 3—3 of FIGURE 2.

FIGURE 4 is a sectional view taken on the line 4—4 of FIG. 7 illustrating a drain plug located in one of the tubular frame members.

FIGURE 5 is a sectional view illustrating the manner in which the conduit leading from the engine manifold is connected to a tubular frame member.

FIGURE 6 is a sectional view taken on the line 6—6 of FIGURE 5.

FIGURE 7 is a partial plan view of another type of frame adapted for automotive vehicles.

FIGURE 8 is a sectional view of the circled area of FIGURE 7.

FIGURE 9 is a sectional view illustrating another way of connecting the flexible conduit to the tubular frame member.

FIGURE 10 is a sectional view taken on the line 10—10 of FIGURE 7.

FIGURES 1 and 2 illustrate a part of an automotive vehicle designated by the numeral 10. The term "automotive vehicle" includes a self-moving or propelled device for transporting persons, equipment or goods over land. The vehicle 10 which is illustrated schematically as an automobile has a frame 12 consisting of tubular members which may be appropriately bolted together or made as an integral or unitary frame and underbody construction. The frame 12 supports the various units of the automotive vehicle. It is essential that the frame 12 be not only structurally sound but that it be easy to fabricate, include low cost materials, provide a reduction in vehicle weight and include certain design advantages which make it particularly adaptable for modern day vehicles.

The frame 12 includes a pair of tubular side supporting members 14 which extend lengthwise of the vehicle 10. The ends of the side members 14 are connected by stiffening and reinforcing members 16. The entire frame 12 whether made as a separate unit or as part of the vehicle's body is made of heavy steel channels—welded construction as best illustrated in FIGURE 3. Additional transverse stiffening members may be provided for bracing and tying the structural side supporting members 14 together, such stiffening members being indicated at 18. Each tubular side supporting member 14 consists of a pair of channel-shaped members 20 and 22 which are arranged in the form of a tube and are welded at the flanges thereof to provide an air tight conduit or tubular side supporting member 14.

The automotive vehicle 10 includes the usual four ground engaging wheels 19, an internal combustion engine 21 which is appropriately mounted on the frame 12, an engine drive shaft 24 and the manually operated steering wheel and column 26. The exhaust manifold of the engine 21 is designated by the numeral 28. When an eight cylinder internal combustion engine 21 is utilized, two exhaust manifolds 28 are provided as illustrated in FIGURE 2. When a six cylinder engine is utilized only one exhaust manifold 28 is usually provided.

In order to practice the invention, it is advisable that the tubular side members 14 be closed so as to be substantially air tight. In other words if the tubular side members 14 are provided with holes therein for mounting pipes or lines on the side members 14 it is necessary that the holes be eliminated by welding in order to prevent leakage of the exhaust gases into the interior of the automobile. Near the ends of the side members 14 are provided closure plates or caps 30 which prevent short circuiting of the exhaust gases through the remaining parts of the frame 12.

The present invention has eliminated the use of the standard exhaust pipe and tailpipe by taking advantage of the tubular frame construction. In other words, the tubular frame members 14 not only provide support for the engine 21 and body of the vehicle 10 but also serve as conduits for the passage of exhaust gases from the exhaust manifolds 28 of the engine 21 to the atmosphere.

If the engine 21 has one exhaust manifold 28 then only one side member is utilized as an exhaust conduit. If the engine 21 has eight cylinders and is provided with two exhaust manifolds then both tubular side members 14 are utilized as exhaust conduits. The side member 14 has an inlet 32 and an outlet 34 in the side walls thereof. The exhaust manifold 28 is connected to the inlet 32 by means of a flexible conduit 36. The conduit 36 has a flange 38 at one end which is connected to the flange 40 provided on the exhaust manifold 28 as best illustrated in FIGURE 1. Th other end of the conduit 36 has a flange 41 which is connected to an inside wall 42 of the frame member 14 as best illlustrated in FIGS. 5 and 6. The conduit 36 is flexible in order to compensate for any misalignment between the manifold 28 and the inlet 32. The conduit 36 which is usually made from rubber also is effective to withstand the vibrations of the engine. The flexible tube or conduit 36 is provided with a tubular metal end or fitting 46 to which the flange 41 is connected by welding. The inside of the wall 42 has welded thereto a pair of nuts 48 as best illustrated in FIGURES 5 and 6. The flange 41 has a pair of openings 50 which receive threaded fasteners 52 for appropriately connecting the flexible conduit 36 to the inlet 32 of the tubular side member 14. A gasket 54 is provided between the wall 42 and the flange 41.

A relatively short exhaust tube 56 is provided with a flange 58 which is adapted to be bolted to a side member 14 as best illustrated in FIGURES 1 and 2. The exhaust tube 56 directs the exhaust gases from the interior of the tubular side member 14 to the atmosphere.

Intermediate the ends of each side member 14 an elongated opening 60 is provided. Spaced around the perimeter of the opening 60 are a plurality of threaded openings. A closure plate 62 is adapted to close the opening 60 and is secured to the side member 14 by a plurality of bolts 64. By removing the closure plate 62, a muffler or cartridge 66 may be inserted in or removed from the interior of the side member 14. The replaceable muffler or cartridge 66 may be made of spun glass, fiber glass, steel wool or the like, the essential purpose of the muffler or cartridge being to change the pulsating flow of the exhaust gases to a smooth, quiet flow which will emerge into the outside atmosphere without noise. The filtering material is arranged to reduce the exhaust back pressures created by overlapping of the power strokes of the engine.

When the useful life of the muffler or cartridge 66 has been exceeded, all that is required is that the bolts 64 and plate 62 be removed from the side member 14 and a new muffler inserted after which time the plate 62 is again bolted to the side member 14.

The bottom wall of the tubular side member 14 has various low points. The low points serve as sumps 70 for the collection of acids, liquids and other products of condensations. The sump 70 is provided in the bottom wall thereof with a tubular threaded fitting 72 which is adapted to receive a threaded drain plug 74. The purpose of the drain plug 74 is to facilitate the removal of condensations from the interior of the tubular side members 14 to prevent corrosion of the tubular side members 14.

The frame 12 just described is commonly referred to as a box type frame and is of the type utilized in Ford automobiles since 1955. However, other types of tubular frames may be utilized such as the X type of tubular frame illustrated in FIGURES 7 and 8 and which is designated by the numeral 75. Where applicable, the same numerical designations will be utilized in FIGURES 7 through 10 to designate similar parts.

The X type frame 75 has a pair of tubular frame supporting members 76 and 78 which are identical in construction. Each of the side supporting members 76 and 78 has a longitudinally extending tubular side supporting brace 80. In addition, appropriate transverse stiffening members 82 are provided for bracing and tying the structural side supporting members 76 and 78 together. The frame 75 may be constructed by bolting or welding the various component parts thereof together as described for frame 12.

A side supporting member 76 has a pair of closure plates or caps 84 which close the ends of the side supporting member 76 to the atmosphere. The side supporting member 76 is provided with an inlet 32 and an outlet 34. The inlet 32 is connected by the conduit 36 to the exhaust manifold 28 while the outlet 34 has a relatively short exhaust tube 56 leading therefrom to the atmosphere. It should be observed that the longitudinally extending tubular brace 80 is closed at 86 by parts of the wall of the tubular side supporting member 76. In addition, the tubular side supporting member 76 is provided with the previously described sumps 70 and drain plugs 74 as well as a replaceable muffler 66.

FIGURE 9 is a modification of the adaptor connection illustrated in FIGURE 5. In this figure a solid retainer plate 90 is welded to the inner wall of a tubular side supporting member. The solid retainer plate 90 has a pair of threaded openings 92 which are adapted to receive the threaded fasteners 52 as illustrated in FIGURE 6 when the flange 41 of the flexible conduit 36 is fastened to the tubular side supporting member.

It should be understood that the tubular side supporting members may be appropriately stamped during their manufacture to provide the holes for the drain plugs 74 and also the openings for the replaceable muffler. Also, the threaded fitting 72 may be formed as a result of a stamping and threading operation. The locations of the drain plug 74 will vary for different makes of automobiles. However, it is recommended that the plugs be located at low points to facilitate the removal of condensation. Various types of drain plugs may be utilized so that they may be removed by conventional hand tools. The drain plugs would be removed by a mechanic when the automobile is being serviced.

The various component parts of the present invention may be made of various commercially available metals and the component parts such as the various fittings may be connected to the tubular side supporting members by welding or by bolts.

The drawings and the foregoing specification constitute a description of the improved exhaust system in such full, clear, concise and exact terms as to enable any person skilled in the art to practice the invention, the scope of which is indicated by the appended claim.

What I claim as my invention is:

A vehicle frame for supporting an internal combustion engine and for transmitting the exhaust gases from the engine to the atmosphere comprising: a tubular frame having a pair of tubular side supporting members and a pair of transversely extending tubular end members which connect said side supporting members so as to define a continuous endless passageway through the interior of said frame; end caps in said passageway adjacent the ends of one of said side supporting members; the portion of said passageway in said one side supporting member between said end caps forming an exhaust conduit; said one side supporting member having inner and outer side walls; an exhaust inlet and an exhaust outlet in the inner side wall of said one side supporting member between said end caps; a flexible conduit connecting the exhaust manifold of the internal combustion engine to said inlet of said one side supporting member to compensate for misalignment between the manifold and said inlet; a relatively short exhaust tube connected to the outlet of said one side supporting member; an opening in the inner side wall of said one side supporting member approximately midway between the ends thereof through which a replaceable muffler is inserted into the interior of said one side supporting member to change the pulsating flow of the exhaust gases to a relatively smooth and subsequently quiet flow; a removable closure plate spanning the opening in said inner side wall of said one supporting member for closing same; a plurality of adjustable threaded fasteners securing said plate to said inner wall; the bottom wall of said one side supporting member being downwardly depressed to form a pair of sumps, one sump on each side of said muffler for collecting the products of condensation from the exhaust gases in said conduit; and a removable drain plug in the bottom wall of each of said sumps for facilitating the removal of the products of condensation from the interior of said conduit; said end caps being effective to prevent short circuiting of the exhaust gases throughout the remaining portions of the tubular frame.

References Cited in the file of this patent

UNITED STATES PATENTS

| | | |
|---|---|---|
| 1,781,503 | Ford | Nov. 11, 1930 |
| 1,789,971 | Ford | Jan. 27, 1931 |
| 2,078,420 | Sheldrick | Apr. 27, 1937 |
| 2,138,001 | Fluor | Nov. 29, 1938 |
| 2,231,586 | Miller | Feb. 11, 1941 |
| 2,875,841 | Henderson | Mar. 3, 1959 |
| 2,981,351 | Knickerbocker et al. | Apr. 25, 1961 |

FOREIGN PATENTS

| | | |
|---|---|---|
| 743,439 | Germany | Dec. 27, 1943 |